United States Patent
Frederick et al.

(10) Patent No.: US 6,208,326 B1
(45) Date of Patent: *Mar. 27, 2001

(54) APPARATUS AND ASSOCIATED METHOD FOR SELECTING VIDEO DISPLAY PARAMETER OF A COMPUTER-SYSTEM, VIDEO DISPLAY MONITOR

(75) Inventors: John W. Frederick, Spring; Thomas J. Brase, Houston; Mark P. Vaughan, Spring, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,865

(22) Filed: Sep. 30, 1997

(51) Int. Cl.[7] .................................................. G09G 5/00
(52) U.S. Cl. ..................... 345/132; 345/112; 348/552; 348/553; 348/554
(58) Field of Search .............................. 345/112, 10, 127, 345/132, 212, 185, 214; 348/486, 492, 476, 673, 734, 541, 549, 722, 785, 554, 552, 569, 553, 555, 556, 558

(56) References Cited

U.S. PATENT DOCUMENTS

| | | | |
|---|---|---|---|
| 4,626,892 | * 12/1986 | Nortrup et al. | 358/22 |
| 5,270,821 | * 12/1993 | Samuels | 348/552 |
| 5,274,753 | * 12/1993 | Roskowiski et al. | 345/116 |
| 5,457,473 | * 10/1995 | Arai et al. | 345/132 |
| 5,602,567 | * 2/1997 | Kanno | 345/132 |
| 5,819,156 | * 10/1998 | Belmont | 345/327 |
| 5,905,497 | * 5/1999 | Vaughan et al. | 345/157 |
| 6,011,592 | * 1/2000 | Vanghan et al. | 348/552 |

OTHER PUBLICATIONS

Nilsson, Frank; "DVD—the storage medium for the future?", Accessed Sep. 8, 1997; pp. 1–9.

DVD Frequently Asked Questions (with answers!); Accessed Jun. 18, 1997; http://www.videodiscovery.com/vdyweb/dvd/vdfaq.html.

Parker, Dana J.; "DVD: The Update"; *CD–ROM Professional*, Aug., 1996; Accessed Sep. 8, 1997; pp. 1–10.

"Digital Video Disc: The Coming Revolution in Consumer Electronics"; *C–Cube Microsystems;* Accessed Jun. 23, 1997; http://www.c–cube.com/technology/dvd.html.

"Toshiba SD3006 DVD Digital Video Disc Player"; Consumer Direct Warehouse; Accessed Jun. 18, 1997; http://www.consumerdirect.com/detail.com/detail.cfm?V-PARTNO=SD3006&WEIGHT=9.0&Q=230.0.

* cited by examiner

*Primary Examiner*—Dennis-Doon Chow
(74) *Attorney, Agent, or Firm*—Akin, Gump, Strauss, Hauer& Feld, LLP

(57) ABSTRACT

Apparatus, and an associated method, selects parameters determinative of video display characteristics of video displays displayable upon a video monitor. The parameters, such as brightness and contrast parameters, are stored at the video display monitor. The video display monitor is connected to a computer system unit. During booting operations, the video display parameters are retrieved by the computer system unit and selectably used to determine the video display characteristics of video displays displayable upon the video display monitor.

16 Claims, 3 Drawing Sheets

APPARATUS AND ASSOCIATED METHOD FOR SELECTING VIDEO DISPLAY PARAMETER OF A COMPUTER-SYSTEM, VIDEO DISPLAY MONITOR

BACKGROUND OF THE INVENTION

1. Field of the Invention

The present invention relates generally to the selection of monitor parameters, such as brightness and contrast parameters, which determine video display characteristics of video displays displayable upon a video display monitor of a computer system. More particularly, the present invention provides apparatus, and an associated method, in which the monitor parameters are stored at the video display monitor.

When the monitor parameters are stored at the video display monitor, the parameters can be factory-set and individualized for each video display monitor. A consistent picture quality of video displays displayable upon video display monitors of mass-produced computer systems, such as convergent devices, is possible. The values of the parameters required to produce a video display of selected characteristics upon every video display monitor can be set during factory testing of the video monitor. Also, video display monitors of different constructions, such as those manufactured by different manufacturers, can similarly also be caused to produce video displays of the selected characteristics irrespective of their source of manufacture.

During system start-up, i.e., system booting, the computer system unit retrieves the monitor parameters stored at the video display monitor. The retrieved monitor parameters are used to select the video display characteristics. Because the monitor parameters are unique to each video display monitor, a video display of consistent characteristics is assured.

An embodiment of the present invention is advantageously utilized in a convergent device, such as a television converged with a personal computer. A video display of characteristics, consistent for any video display monitor is provided, when the convergent device is operable in any of its operational modes.

2. Description of Related Art

Technological advancements in many varied technologies have permitted the development of many new types of, inter alia, consumer products as well as the improvement of existing products. The technical advancements precipitating such new, and improved, products are not necessarily in only discrete and disparate fields. Convergence of technologies, and the associated technological advancements in the respective technologies, have created synergies. Such synergies have permitted the introduction, and improvement, of yet additional products.

For instance, a much sought-after goal has been to achieve convergence of various information, entertainment, and communication technologies. Exemplary of this goal have been attempts to integrate computer technologies with consumer, communication technologies.

Efforts have been made, for instance, to create a single integrated device to be used for information processing, entertainment, and communications. Such a product would, for instance, utilize the available communications bandwidth and, further, utilize the mass storage and graphic handling capabilities of a personal computer to deliver, store, and display a variety of applications in a manner to provide a seamlessly-unified, audio-visual environment to a consumer of the product.

To assist in the realization of such a goal, efforts have been made to develop a video display monitor capable of presenting high-quality video displays thereon. Such a high-quality video display monitor is of better quality than display monitors typically associated with information processing devices, such as personal computers.

Conventionally, a personal computer display monitor is driven by personal computer video signals formed of three color signals—red, blue, and green and two sync signals—vertical and horizontal. Such conventional display monitors are typically not capable of displaying high-quality images usually expected in a consumer entertainment and communications unit, such as a conventional television. Conventional personal-computer display monitors create video displays generally considered to be of poor quality, exhibiting dullness and low contrast, relative to the video displays typically provided by a consumer home electronics and communications unit. Such problems stem, in part, because variable and selectable settings are generally not available on personal computer display monitors.

Conventionally, in the operation of a personal computer, parameters stored at the personal computer define the settings of the video display monitor and the resultant video displays displayable thereon. Such parameters thereby must be generic for every video display monitor. However, even when video display monitors are manufactured identically, manufacturing variances cause the displays displayable upon different video display monitors to differ, even when set with identical parameters.

A manner by which to provide better for consistency in the generation of video displays displayable upon video monitors of mass-produced computer systems would be advantageous. Such improved consistency would permit a video display of consistent characteristics, for a given input, by any video display monitor, irrespective of its manufacture.

When embodied in a convergent device, such as the aforementioned integrated device for information processing, entertainment, and communications decoupling of the video display monitor and the computer system unit would be permitted. Separate selection and purchase of the computer system unit and the video display monitor would be permitted. That is to say, the system unit and the video display monitor need not be commonly manufactured and sold together as a single unit. Instead, a video display monitor and the system unit could be separately manufactured and separately purchased. Consumer selection of the computer system unit and video display monitor, separately or together, as desired, would be permitted.

It is in light of this background information related to video display monitors, such as those used to form portions of convergent devices, that the significant improvements of the present invention have evolved.

SUMMARY OF THE INVENTION

The present invention, accordingly, advantageously provides apparatus, and an associated method, in which monitor parameters, such as brightness and contrast parameters, are stored at a video display monitor. The monitor parameters are determinative of video display characteristics of video displays displayable upon a video display monitor of a computer system.

Operation of an embodiment of the present invention permits a consistent picture quality of video displays displayable upon video display monitors of mass-produced computer systems to be provided. Monitor parameters are selected for a video display monitor during testing, such as during initial factory testing. The monitor parameters are selected such that the video display monitor displays a picture quality of selected characteristics. Once the monitor parameters are determined, values indicative of such monitor parameters are stored at the video display monitor. When later connected to a system unit of a computer unit, such as a convergent device, the monitor parameters are retrieved during system start-up and used to determine the video display characteristics of the video displays displayable upon the video display monitor.

Because the values of the parameters required to produce a video display of selected characteristics upon every video display monitor can be set during factory testing of the monitor, video displays displayed upon various video display monitors can all be of common characteristics. Manufacturing variances between video display monitors are overcome as the monitor parameters are individualized for each video display monitor.

Furthermore, video display monitors of different constructions also can similarly be caused to produce video displays of the selected characteristics irrespective of their sources of manufacture.

In one aspect of the present invention, a convergent device, such as a single integrated device for information processing, entertainment, and communications, includes a video display monitor connectable to a computer system unit. During system start-up of the integrated device, monitor parameters stored at the video display monitor are retrieved and selectably used to determine the video display characteristics of video displays displayable upon the video monitor.

In another aspect of the present invention, default parameters are further stored at the computer system unit. The monitor parameters stored at the video monitor are retrieved and compared with the default values. If the monitor parameters differ too greatly from the default values, the monitor parameters stored at the video display monitor are not selected to be used to determine the video display characteristics of the video displays displayable upon the video monitor. Instead, values related to the default values are used to determine the video display characteristics.

In another aspect of the present invention, user-selectable parameters are further selectable by a user of the integrated device. Such user-selected parameters are used to determine the video display characteristics of the video displays.

The monitor parameters stored at the video display monitor are accessible when the convergent device is operable in any of the operational modes permitted of the device. For instance, in the aforementioned convergent device, such parameters are accessible and used by the convergent device when the device is to be operated in either a computer mode or a television mode. The values are also used when transferring between operational modes.

In these and other aspects, therefore, apparatus, and an associated method, select at least one video display parameter determinative of at least one characteristic of a video display. The video display is displayable upon a video display monitor of a computer system. The computer system further includes a computer system unit which is connectable to the video display monitor. A video-display-parameter storage device is positioned at the video display monitor. The video-display-parameter storage device stores the at least one video display parameter thereat. The video display parameter stored at the video-display-parameter storage device is accessible by the computer system unit at least during computer system booting operations. The video display parameter is selectably used to determine the at least one characteristic of the video display.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
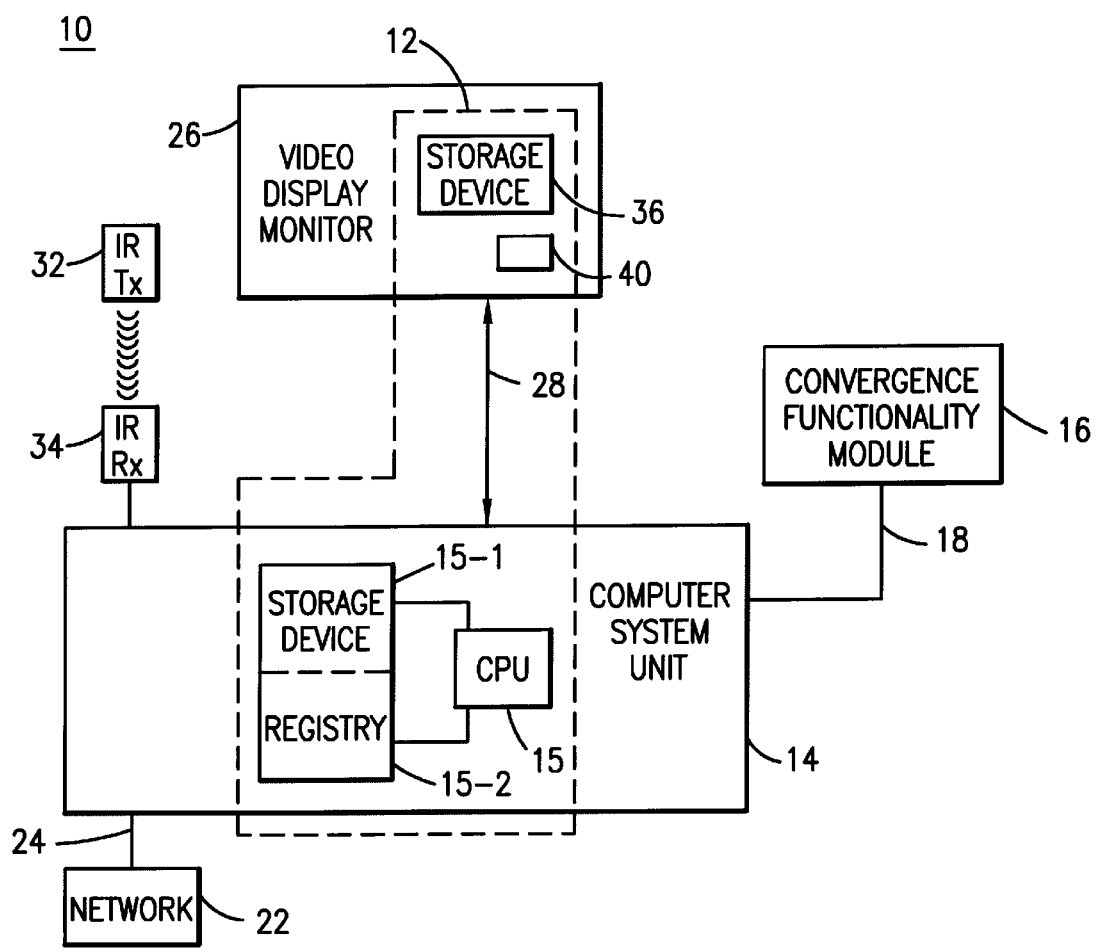
FIG. 1 illustrates a functional block diagram of a convergent device in which an embodiment of the present invention forms a portion.

Referring first to FIG. 1, a convergent device, shown generally at 10, includes the apparatus 12 of an embodiment of the present invention. The convergent device 10 shall be described with respect to an exemplary implementation in which a television is convergent into a computer device. It should be understood at the outset, however, that the convergent device can similarly represent other types of convergent devices and that the apparatus 12 can similarly form a portion of such other convergent devices.

The convergent device 10 here includes a computer system unit 14 operable to perform computer functions through execution of algorithms by a CPU (central processing unit) 15. A default parameter storage device 15-1 and/or a registry 15-2 are coupled to the CPU 15. Values are stored in, and retrieved from, the storage device and/or registry 15-1 and 15-2 during operation of an embodiment of the present invention. While not separately shown, the computer system unit 14 also includes other components, such as storage subsystems, etc., operable in conventional manner. The computer system unit 14 includes, e.g., structure analogous to that of which conventional personal computers are formed.

The convergent device 10 further includes a convergence functionality module 16, here to provide tele-video functions. The module 16 is shown to be functionally connected to the computer system unit 14 by way of the line 18. In one implementation, for instance, the convergence functionality module forms a television circuit card which is plugged into a computer backplane of the computer system unit 14. The computer system unit 14 is here shown further to be coupled to a network 22, here by way of the line 24. The network 22 is exemplary, inter alia, of an Internet and of a television source.

The convergent device 10 is operable in both a computer mode and a television mode. When in the computer mode, computer functions are provided by the convergent device, and, when in the television mode, tele-video, such as television, functions are provided by the convergent device.

A video display monitor 26 is connected to the computer system unit 14 by way of the line 28. The video display monitor may, for example, be formed of a CRT (cathode ray tube) or a flat panel display. The video display monitor 26 is operable not only to form a portion of the user interface 12, but is also operable during functioning of the convergent device 10 in both the computer mode and the television mode. For instance, when in television mode, tele-video images are displayed upon the video display monitor. Alternatively, when in computer mode, computer displays are generated and displayed upon the video display monitor.

The convergent device 10 further includes an input device, here an infrared assembly formed of a remote input device 32 and an infrared receiver 34. The remote input device 32 is operable to generate infrared signals which are received by the infrared receiver 34. The infrared receiver is coupled to the computer system 14. By appropriate actuation of actuation keys of the remote input device 32, a user is able to generate input commands to control operation of the convergent device.

The video display monitor further includes a video-display-parameter storage device 36. The storage device 36 includes storage elements for the storage thereat of parameters forming settings which, when used, are determinative of characteristics of video displays generated upon the monitor 12.

During operation of an embodiment of the present invention, when the convergent device 10 is turned-on, the computer system unit 14 is operable, during its booting operations, to retrieve values of the parameters stored at the storage device 36. The values of the parameters retrieved from the storage device 36 are compared with values of default parameters stored at the default parameter storage device 15-1. If the default parameters, e.g., min and max threshold values are not available, coded values, retrieved and cached during booting operations, are used.

In one embodiment, the comparison process compares the value of each video display parameter retrieved from the storage device 36 with a lower and an upper threshold value, i.e., the min and max threshold values, to ensure that the retrieved value is within an acceptable range of values. If so, a value of the video display parameter is written to the registry 15-2. Thereafter, the values stored at the registry are used to set the operational parameters of the video display 26.

If, conversely, a retrieved value is beyond an acceptable range of values, a default parameter, selected from the default parameters stored at the storage device 15-1 or a value related thereto, is stored at the registry 15-2. Thereafter, the values of the parameters stored at the registry 15-2 are used to set the video display characteristics of the video display monitor 26.

In one embodiment of the present invention, and as illustrated in FIG. 1, the video display monitor 26 further includes at least one input actuator 40. The input actuator permits user selection of parameters determinative of video display characteristics of the video displays displayable upon the video display monitor 26. Such user-selected inputs may alternately be provided to the computer system unit 14 by way of the infrared assembly.

Analogous to comparison of the values of the parameters stored at the storage device 36, the user-selected values, in one embodiment, are also compared with values of default parameters stored at the storage element 15-1 and/or registry 15-2. And, responsive to the comparison, values are stored in the registry 15-2 and used to select the video display characteristics of the video display monitor 26.

The video display parameters stored at the storage device 36 may, for example, be stored thereat during factory testing of the video display monitor. Thereby, compensation can be made for manufacturing variances between individual video display monitors, and consistency of display characteristics of video displays generated by various video display monitors can be better assured In an embodiment in which different parameters are used when operating in different operational modes of the convergent device, separate parameters can be stored at the storage device 36, and appropriate ones of the parameters can be retrieved dependent upon the operational mode of the convergent device. Such retrieval can be performed, both as described above during system start-up as well as when changing the operational mode of the convergent device during its operation.

Figure 2:
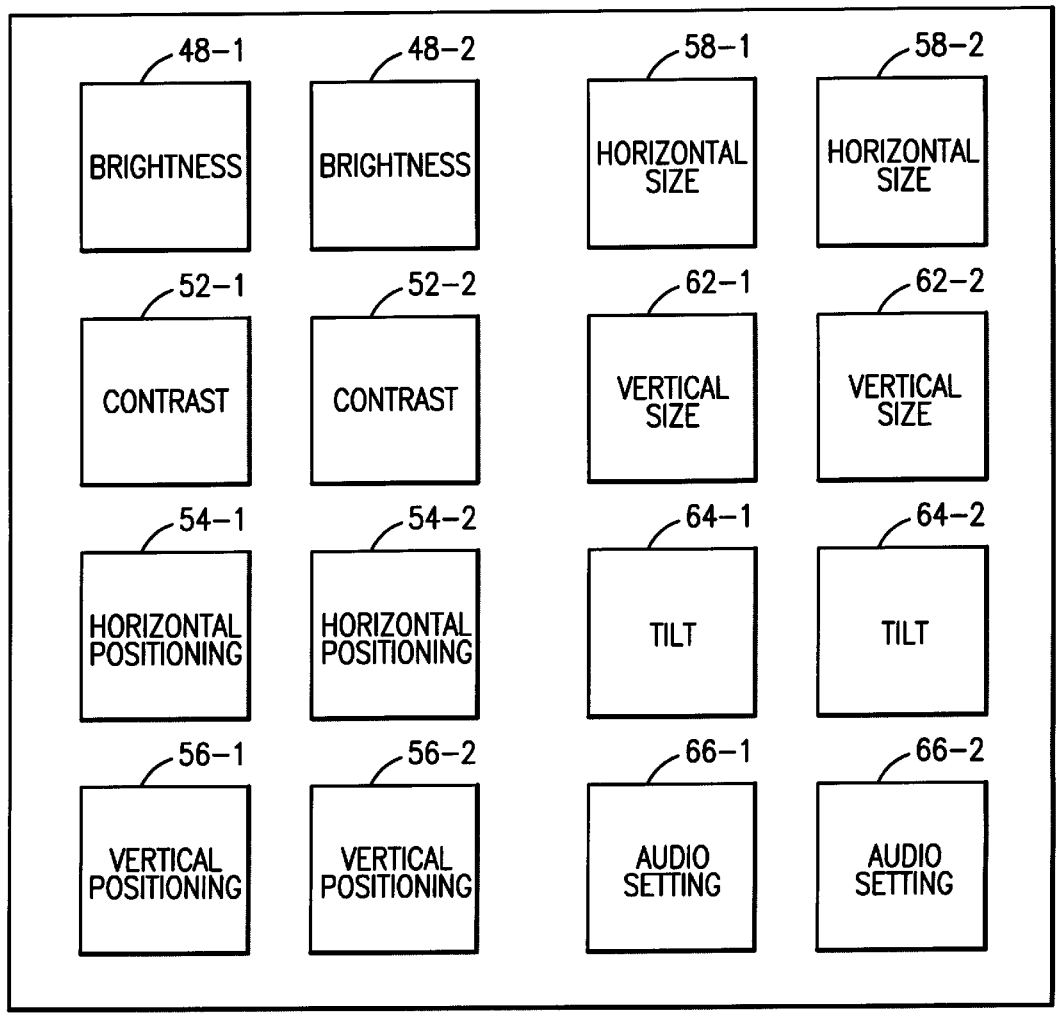
FIG. 2 illustrates a functional block diagram of a video-display-parameter storage device, shown previously in FIG. 1, here further showing the parameters stored thereat according to an embodiment of the present invention.

FIG. 2 illustrates the storage device 36 which forms a portion of the video display monitor 26. Here, the memory elements at which the video display parameters are stored are functionally shown. In the illustrated embodiment, separate storage elements are illustrated for parameters used during operation in the two separate operational modes of the convergent device. Storage elements accessed during operation of the convergent device in a first operational mode are suffixed by the reference numeral -1, and storage elements accessible during operation of the convergent device in a second operational mode are suffixed by the reference numeral -2.

In the exemplary embodiment, video display screen brightness characteristics are stored in the memory elements 48-1 and 48-2 and video display screen contrast parameters are stored at the storage elements 52-1 and 52-2. Horizontal positioning parameters are stored in the storage locations 54-1 and 54-2 and vertical positioning parameters are stored in the storage locations 56-1 and 56-2. Horizontal size parameters are stored in the storage elements 58-1 and 58-2 and vertical size parameters are stored in the storage elements 62-1 and 62-2. Tilt parameters are stored in the storage elements 64-1 and 64-2. And, default audio setting values are stored in the storage elements 66-1 and 66-2.

The storage elements of the storage device 36 are accessible during operation of the convergent device by way of, for example, a USB, DDC2V custom serial communication cable conventionally connected between a video display monitor and a computer system unit, here the computer system unit 14. Results of comparisons performed by the comparator formed of the CPU 15 are provided, for instance, to a video card (not shown in the Figure) by way of a PCI (peripheral component interface/interconnect) bus, in conventional manner. The video card is operable to control the operation, including video display characteristics of the video display monitor 26.

Figure 3:
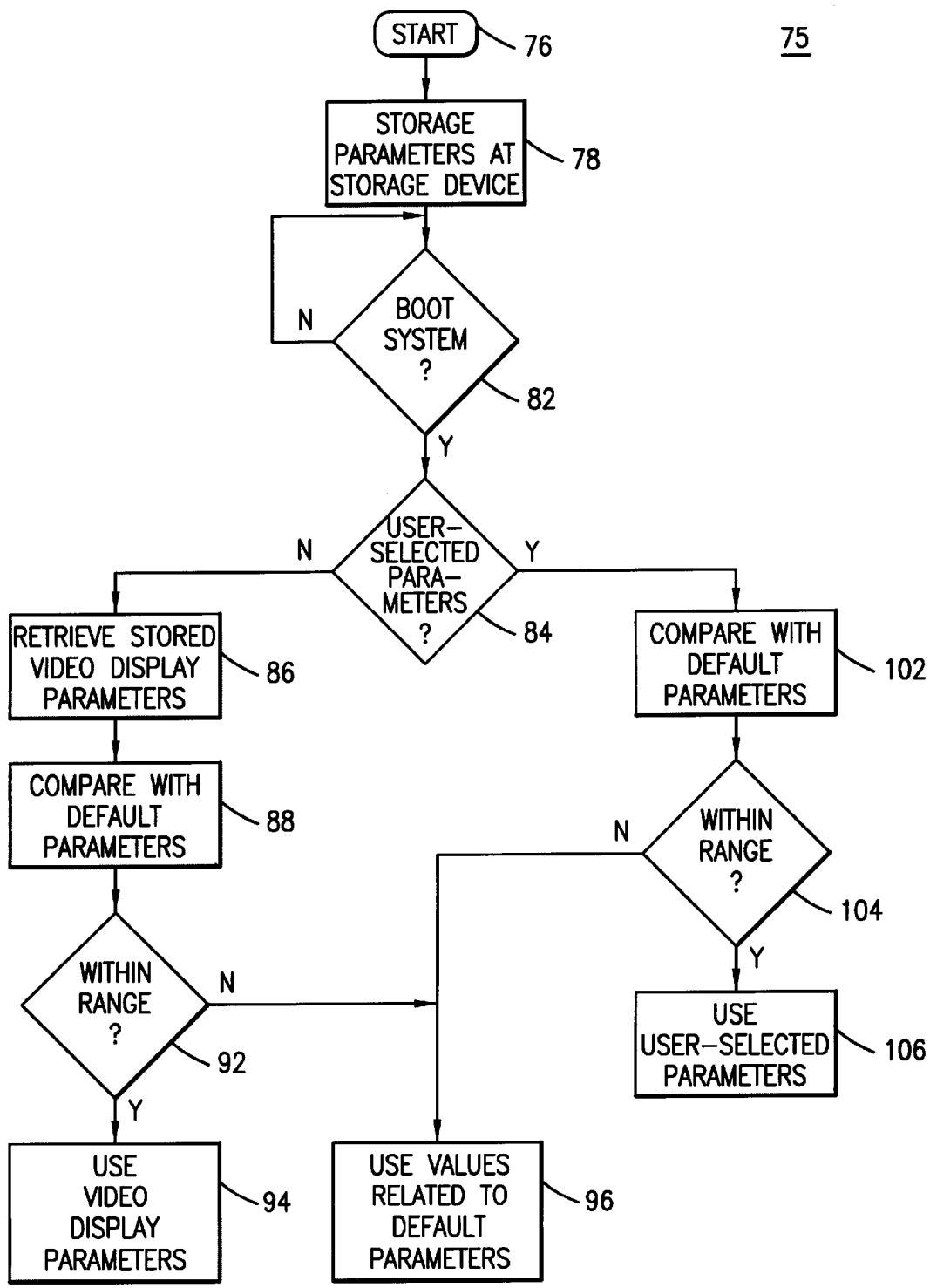
FIG. 3 illustrates a method flow diagram showing the method of operation of an embodiment of the present invention by which a video display parameter is selected during operation of an embodiment of the present invention.

FIG. 3 illustrates a method, shown generally at 75, of an embodiment of the present invention. The method 75 is carried out to select the video display characteristics to be exhibited by video displays displayable upon a video display monitor of a computer system, such as a convergent device.

First, after entry indicated by the start block 76, video display parameters are stored at a storage device positioned at a video display monitor, as indicated by the block 78. Then, as indicated by the decision block 82, a determination is made as to whether the system is to be booted. If not, the no branch is taken back to the decision block 78. Otherwise, the yes branch is taken to the decision block 84 whereat a determination is made as to whether user-selected parameters are selected.

If user-selected parameters are not selected, the no branch is taken to the block 86 and the video display parameters stored at the storage device of the video display monitor are retrieved. Then, and as indicated by the block 88, the video display parameters are compared with default parameters, as indicated by the block 88.

Then, as indicated by the decision block 92, a determination is made as to whether the values of the retrieved video display parameters are within an acceptable range. If so, the yes branch is taken to the block 94 and the video display parameters are used to determine the video display characteristics of the video display monitor. If the retrieved values are not within an acceptable range, the no branch is taken from the decision block 92 to the block 96. And, values related to the default parameters are used to determine the video display characteristics of the video display monitor.

If user-selected parameters are determined to have been selected at the decision block 84, the yes branch is taken therefrom to the block 102. At the block 102, values of the user-selected parameters are compared with default parameters.

Then, and as indicated by the decision block 104, a determination is made as to whether the values of the user-selected parameters are within an acceptable range. If so, the yes branch is taken to the block 106, and the user-selected parameters are used to determine the video display characteristics of the video display monitor.

If, conversely, the values of the user-selected parameters are beyond an acceptable range, the no branch is taken from the decision block to the block 96. And, values related to the default parameters are used to determine the video display characteristics of the video display monitor.

Because the video display parameters are stored at the video display monitor, the parameters can be selected for a particular video display monitor during testing thereof. A consistent picture quality of video displays displayable upon the video monitors of mass-produced computer systems is possible. When embodied in a convergent device, such as television converged into a personal computer, a video display of characteristics consistent for any video display monitor is permitted even with operation of the convergent device in any of the operational modes permitted of the convergent device.

The previous descriptions are of preferred examples for implementing the invention, and the scope of the invention should not necessarily be limited by this description. The scope of the present invention is defined by the following claims.

What is claimed is:

1. In a system having a computer system unit and a video display monitor connectable to the computer system unit, an apparatus for alternately selecting a first video display parameter and a second video display parameter, said apparatus comprising:

video display parameter storage device positioned at the video display monitor, said video display parameter storage device for storing the first video display parameter and the second video display parameter thereat, the first and second video display parameters stored at said video display parameter storage device accessible by the computer system unit;

a convergent device alternately operable in a computer operational mode and in a non-computer operational mode; and a comparator coupled to receive an indication of the first video display parameter stored at said video display parameter storage device and accesible by the computer unit, said comparator for comparing a value of the indication of the first video display parameter with at least one threshold value, the video display parameter selected to be used to determine at least one characteristic of the video display if the value of the first video display Parameter is in a selected relationship with the threshold value, wherein the video display monitor is operable to display a first image according to the first video display parameter responsive to the convergent device operating in the computer operational node, and wherein the video display monitor is operable to display a second image according to the second video display parameter responsive to the convergent device operating in the non-computer mode.

2. The apparatus of claim 1 wherein the first video-display-parameter includes a first setting associated with a particular adjustable characteristic of the video display monitor and wherein the second video display parameter includes a second setting associated with the particular adjustable characteristic of the video display monitor, the first setting and the second setting being different.

3. The apparatus of claim 2 wherein the characteristic of the video display monitor includes one of brightness, contrast, horizontal positioning, vertical positioning, horizontal size, vertical size, tilt, audio and color.

4. The apparatus of claim 1 wherein the at least one threshold value comprises a lower threshold value and an upper threshold value, said comparator for comparing the value of the indication of the first video display parameter with both the lower threshold value and the upper threshold value, the first video display parameter selected to be used to determine the at least one characteristic of the video display if the value of the first video display parameter is within a range of values defined by the upper and lower threshold values, respectively.

5. The apparatus of claim 4 further comprising a default parameter storage device positioned at the computer system unit, said default parameter storage device for storing a default parameter thereat, the default parameter selectably used to determine the at least one characteristic of the video display alternative to use of the first video display parameter stored at said video-display-parameter storage device.

6. The apparatus of claim 5 wherein the default parameter is used to determine the at least one characteristic of the video display when the value of the first video display parameter is beyond the selected relationship with the threshold value.

7. The apparatus of claim wherein said comparator is positioned at said computer system unit.

8. The apparatus of claim 1 further comprising a user-selectable input device, said user-selectable input device permitting user selection of a user-selected parameter, the user-selected parameter used, when selected by a user of the computer system to determine that at least one characteristic of the video display alternative to use of the first video display parameter stored at said video display parameter storage device.

9. A method for alternately selecting a first or a second video display parameter responsive to a convergence device being in either a first operational mode or a second operational mode, the first and the second video display parameter each determinative of at least one characteristic of a video display displayable upon a video display monitor, the video display monitor connectable to a computer system unit of a computer system, said method comprising the steps of:

storing the first video display parameter at the video display monitor;

storing the second video display parameter at the video display monitor;

responsive to the convergence device being in the first operational mode, retrieving the first video display parameter, stored during said step of storing the first video display parameter, from the video display monitor;

responsive to the convergence device being in the first operational mode, configuring the video display monitor to be operable according to the first video display parameter associated with the at least one characteristic;

comparing the first video dislay parameter retrieved during said step of retrieving the first video display parameter with at least one threshold value and determining the at least one characteristic of the video display when the first video display parameter is of a value in a selected relationship with the threshold value;

responsive to the convergence device being in the second operational mode, retrieving the second video display parameter, stored during said step of storing the video display parameter, from the video display monitor; and responsive to the convergence device being in the second operational mode, configuring the video display monitor to be operable according to the second video display parameter associated with the at least one characteristic;

wherein the at least one characteristic associated with the first video display parameter and the second video display parameter includes one of brightness, contrast, horizontal positioning, vertical positioning, horizontal size, vertical size, tilt, audio and color.

10. The method of claim 9 wherein the at least one threshold value with which the fist video display parameter is compared during said step of comparing comprises a lower threshold value and an upper threshold value and wherein the first video display parameter determines the at least one characteristic of the video display when the first video display parameter is within a range of values defined by the-upper and lower thresholds, respectively.

11. The method of claim 9 further comprising the step, prior to said step of comparing, of storing the threshold value at the computer system unit.

12. The method of claim 11 wherein said step of comparing is performed at the computer system unit.

13. The method of claim 9 comprising the additional step of using the threshold value to determine the at least one characteristic of the video display when the first video display parameter is beyond the selected relationship with the threshold value.

14. The method of claim 9 wherein the first video display parameter stored during said step of storing comprises a contrast parameter.

15. The method of claim 9 wherein the first video display parameter stored during said step of storing comprises a brightness parameter.

16. A computer system comprising:

a display device alternately operable according to a first display parameter and according to a second display parameter;

a storage device integrated with the display device, the storage device for storing the first display parameter and the second display parameter;

a convergence device connected to the display device, the convergence device operable in a computer functionality mode and a non-computer functionality mode; and a comparator coupled to receive an indication of the first display parameter, said comparator for comparing a value of the indication of the first parameter with at least one threshold value, the first display parameter selected to be used to determine at least one characteristic of the display device if the value of the first display parameter is in a selected relationship with the threshold value, wherein the display device is operable according to the first display parameter stored on the storage device when the convergence device is in the computer functionality mode and wherein the display device is operable according to the second display parameter stored on the storage device when the convergence device is in the non-computer functionality mode.

* * * * *

UNITED STATES PATENT AND TRADEMARK OFFICE
CERTIFICATE OF CORRECTION

PATENT NO. : 6,208,326 B1
DATED : March 27, 2001
INVENTOR(S) : John W. Frederick et al.

It is certified that error appears in the above-identified patent and that said Letters Patent is hereby corrected as shown below:

<u>Column 8,</u>
Line 6, delete "Parameter" and insert therefor -- parameter --.
Line 46, after "claim" insert -- 1 --.

<u>Column 9,</u>
Line 11, delete "dislay" and insert therefor -- display --.

Signed and Sealed this

Twenty-ninth Day of November, 2005

JON W. DUDAS
*Director of the United States Patent and Trademark Office*